Patented May 22, 1934

1,959,701

UNITED STATES PATENT OFFICE 1,959,701

METHOD OF MANUFACTURING HIGH QUALITY SEAMLESS RUBBER ARTICLES

Jacques Balog, Vienna, Austria, assignor to Gustav Balog, Vienna, Austria

No Drawing. Application December 16, 1932, Serial No. 647,700

3 Claims. (Cl. 18—58)

The invention relates to a new method of manufacturing high-quality seamless rubber articles and more particularly preservatives. As is well known, seamless rubber articles are manufactured by dipping from a benzine-rubber solution known per se. To add various resins and certain kinds of oil to these solutions is also known per se. Extensive and repeated testing has proved that the benzine-rubber solution can be very considerably improved by the addition thereto of amber-oil (oleum succini), and upon this fact the present invention is based. This addition can be effected in various ways. The oil of amber can be dissolved in benzine, and this state be simply mixed in to the benzine-rubber solution. It is however equally possible to mix the amber-oil in with the rubber substance by rolling, pressing, or other similar manner.

It has been found that from the benzine-rubber solution containing amber-oil there can be manufactured articles of outstanding quality possessing unusual suppleness, distendability, and fineness.

Example of carrying out the invention:—½% of amber-oil is added to a benzine-rubber solution adapted for use in rubber dipping processes.

What I claim is:—

1. That step in the manufacture of seamless rubber articles from benzine rubber solution, consisting in adding amber oil to such solution.

2. A method of manufacturing seamless rubber articles, consisting in utilizing benzine rubber solution and in adding to such solution amber oil, and manufacturing said articles from the solution including the amber oil.

3. That step in the manufacture of seamless rubber articles from a benzine rubber solution, consisting in adding amber oil to the rubber of the solution prior to the make-up of the solution.

JACQUES BALOG.